J. R. WHELEN.
MEANS FOR OPERATING FISH TRAPS.
APPLICATION FILED JAN. 27, 1914.
1,164,898.
Patented Dec. 21, 1915.
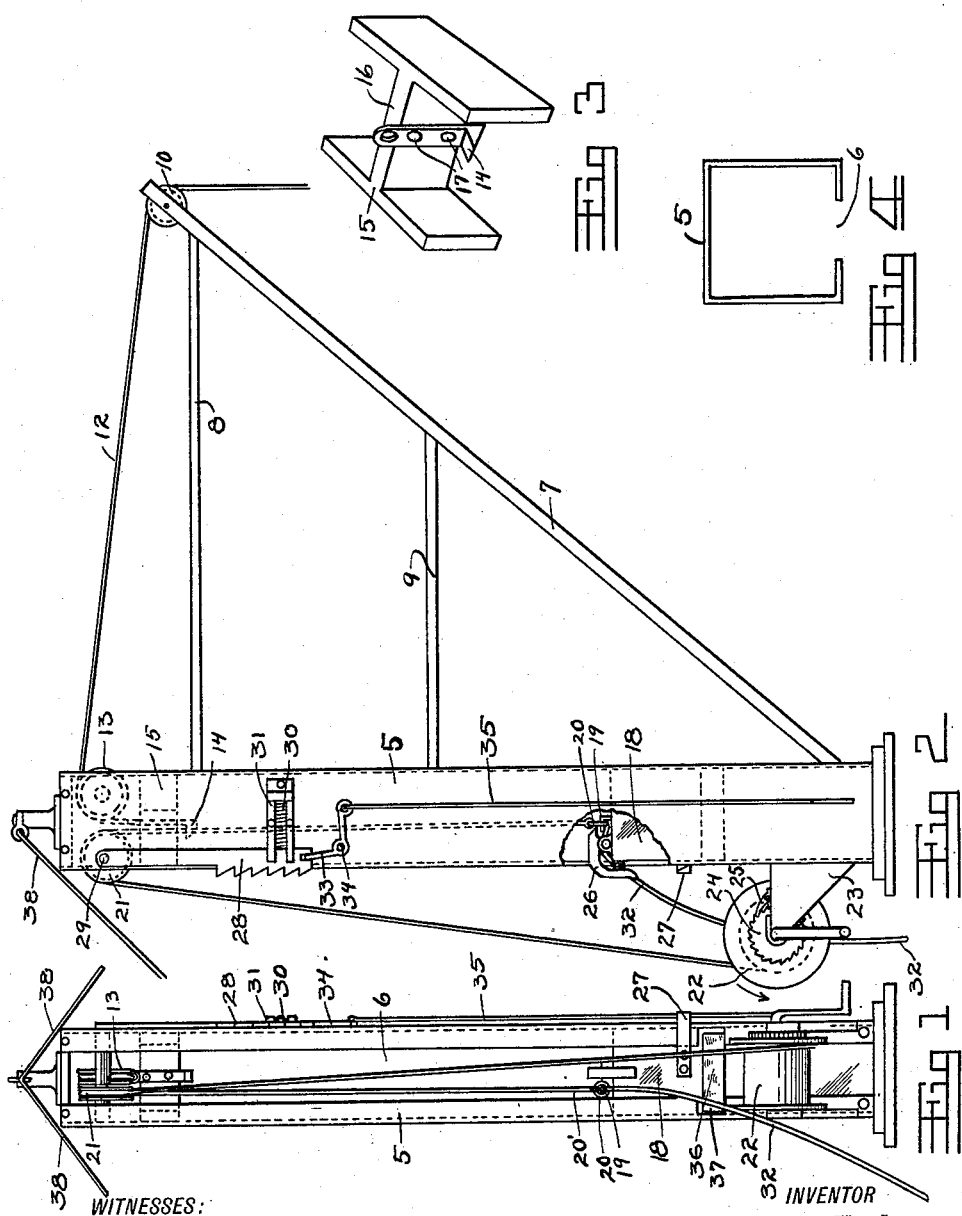
WITNESSES:
Robert H. Galbraith
Thelma A. Kelly.
INVENTOR
James R. Whelen
BY
Jno. G. Powell
ATTORNEY

UNITED STATES PATENT OFFICE.

JAMES R. WHELEN, OF DENVER, COLORADO.

MEANS FOR OPERATING FISH-TRAPS.

1,164,898.      Specification of Letters Patent.     Patented Dec. 21, 1915.

Original application filed January 24, 1913, Serial No. 743,964. Divided and this application filed January 27, 1914. Serial No. 814,625.

*To all whom it may concern:*

Be it known that I, JAMES R. WHELEN, a citizen of the United States, residing in the city and county of Denver, State of Colorado, have invented certain new and useful Improvements in Means for Operating Fish-Traps; and I do declare the following to be a full, clear, and exact description of my invention, such as will enable others skilled in the art to which it appertains to make and use the same, reference being had to the accompanying drawing, and to the figures of reference marked thereon, which form a part of this specification.

My invention relates to improvements in means for operating that part of the fish trap which is adapted to be anchored in the water, and is specially designed for operating my trap disclosed in my former application for patent, Serial No. 743,964, the present application for patent being a divisional application of the above mentioned application.

The object of the invention is to provide an effective, simple and positive means of elevating the trap out of the water, together with providing similar means for first operating the trap to inclose or restrain the fish in the trap.

In the following detail description of my invention, many other objects and advantages will become apparent, and it is therefore not considered necessary to recite further objects of the invention here.

I will now proceed to describe my invention with reference to the accompanying drawing, forming a part hereof.

In this drawing, Figure 1 is a front elevation view; Fig. 2 is a side elevation view; Fig. 3 is a view of the cross-head employed, and Fig. 4 is a cross section view of the hoisting frame.

Corresponding and like parts are referred to in the following description and indicated in all the views of the accompanying drawing by the same reference characters.

Let the numeral 5 designate the hoisting frame, formed of sheet metal, and open in front as shown at 6. This hoisting frame 5 is adapted to be mounted at its lower extremity upon a fulcrum, whereby the same may be turned upon its fulcrum to swing the trap over and away from the water. A beam 7 extends from near the bottom of the frame 5, upwardly and at an angle to the said frame, over the water, the upper extremity of said member being connected with the upper extremity of said frame by means of a brace or transverse member 8. A similar brace 9 connects the said beam 7 with the hoisting frame 5, the said brace 9 being interposed at a lower plane than the brace 8. A roller 10 is journaled at the upper extremity of the beam 7, and over which a hoisting cable 12 passes, the said hoisting cable also passing over a roller 13 journaled in the top of the hoisting frame 5. One extremity of this hoisting cable 12 is adapted to be connected with a trap, which is to be anchored in the water, the form of trap which I employ being shown in my copending application Serial No. 743,964, the other extremity of the cable, within the hoisting frame 5, being provided with a hook 14, to which is secured a cross-head 15, slidably mounted within the hoisting frame 5, the said hook 14 being secured to the central member 16 of the cross-head by means of bolts 17. A weight 18 is slidably mounted in the hoisting frame 5 and is provided with a hook 19, adapted to engage with a ring 20, made secure to one end of a cable 20′, which passes over a pulley 21, journaled in the top of the said hoisting frame, the said cable passing thence downward and connected with a winch 22. The winch 22 is journaled on the lower part of the hoisting frame 5 in brackets 23. A ratchet wheel 24 is made fast with the winch 22 and is adapted to be engaged by a pawl 25, mounted upon one of the brackets 23. The trap proper connected with the one end of the cable 12 normally holds the cross-head 15 in the raised position. Now by turning the winch 22 in the direction indicated by the arrow, the weight 18 is caused to be raised and a pivoted dog 26, with which the weight is provided, to engage with the hook 14. The weight 18 is provided with an arm 27, adapted to engage with a rack bar 28 when the said weight is raised, the said rack bar being pivoted at its upper extremity at 29 and having its teeth held in the path of the arm 27 by means of a spring 30 engaging with the lower extremity of said rack bar 28. This spring 30 is arranged in a guide member 31, which is secured to the side of the hoisting frame 5. This guide member 31 also overlaps the rack bar 28 and prevents the said rack bar from swinging away from the hoisting frame.

When the weight 18 is in its raised position, the arm 27 of the latter engages with the rack bar 28, and thus the weight is supported in its raised position. Now the ring 20 may be disengaged from the hook 19 by pulling upon a releasing cable 32, secured to said ring 20, thus leaving the weight 18 supported entirely upon the rack bar 28.

A bell-crank lever is pivoted upon the hoisting frame 5, as shown at 34, one arm of said bell-crank lever being connected with the lower extremity of the rack bar 28, while a cable 35 is connected with the other arm of said bell-crank lever, and by means of which the said bell-crank lever is operated to move the said rack bar inwardly against the tension of the spring 30, thus releasing the weight 18 and allowing the latter to drop, whereby the cable 12 is drawn inwardly to raise the trap proper out of the water. The weight 18 drops upon a removable cushion 36, arranged within the hoisting frame 5 near the bottom of the latter. The hoisting frame 5 is cut away, as shown at 37 so that the said cushion 36 may be inserted and removed. The thickness of the cushion employed may be varied to regulate the drop of the weight 18 and consequently also regulate the distance which the trap proper will be raised from the water. The drop of the weight 18 should preferably be regulated so that the trap will be only partially raised from the water, thus relying upon the specific gravity of the water to partially support the weight of the trap and fish held therein. After the trap has been thus raised, the hoisting frame 5 may be swung on its fulcrum to swing the trap near the shore where the fish may be removed therefrom. Now, when the fish have been removed and the hoisting frame 5 swung back to its original position, the cable 12 may be released from connection with the weight 18, and the trap allowed to sink in the water. This is accomplished by pressing upon the dog 26, whereby the latter is released from the hook 14 and the cable 12 allowed to be drawn outwardly by the weight of the trap as it sinks in the water, the cross-head 15 being also carried to the top of the hoisting frame 5 by the said trap. Now the weight 18 may be again elevated, in the same manner heretofore explained, and connected with the cable 12, whereby the mechanism is again in position to spring the trap when desired. The hoisting frame is braced by means of guy ropes or rods 38, connected with the top of said hoisting frame and extending downwardly and connected with some stationary object.

While I have described and illustrated herein a specific form of my invention it is understood that I am not limited thereto and that the same may be modified and varied without departing from the spirit of my invention or the scope of the appended claims.

Having thus described my invention, what I claim and desire to secure by Letters Patent is:—

1. Means for operating fish traps, comprising a hoisting frame, a weight slidably mounted in said hoisting frame, a cross-head also slidably mounted in said hoisting frame, the said cross-head adapted to be connected with said fish trap, the weight of the fish trap adapted to normally support said cross-head in the raised position, means for connecting the weight with said cross-head, means for raising said weight to connect the latter with said cross-head, a rack bar pivoted upon the hoisting frame at one extremity, the weight being provided with a member adapted to engage with said rack bar, whereby said weight is supported in the raised position, the said rack bar being normally spring held in the path of said member, and means for releasing said rack bar from engagement with said member to permit the weight to drop, whereby the fish trap is raised.

2. Hoisting means, comprising a vertically arranged frame, a weight slidably mounted in said frame, a cross-head also slidably mounted in said frame, a connection between said cross-head and the article to be hoisted, a supporting arm mounted upon said weight, a rack bar mounted upon the said frame in the path of said supporting arm, means for connecting said weight with said cross-head, the said cross-head being normally held in the raised position by the article to be hoisted, means for raising said weight to connect with said cross-head, the said arm adapted to engage with said rack bar when said weight is raised, whereby said weight is supported in the raised position, and means for releasing said weight from said bar to permit the same to drop and elevate the article to be hoisted, substantially as described.

3. Hoisting means, comprising a vertically arranged frame, a weight slidably mounted in said frame, a cross-head also slidably mounted in said frame, means for connecting said weight with said cross-head, means for raising said weight to connect the latter with said cross-head, said weight being provided with a supporting arm, a rack bar mounted upon the said frame and held in the path of said arm, whereby when said weight is raised said arm engages with said rack bar for supporting said weight in the raised position, and means for releasing said weight from said rack bar to permit said weight to drop and elevate the article to be hoisted.

4. Means for operating fish traps, comprising a vertically arranged frame, a weight slidably mounted in said frame, a cross-head also slidably mounted in said frame above said weight, a connection between said cross-head and the fish trap, means for connecting the weight with said cross-head, means for raising said weight to connect the latter with said cross-head, means for retaining said weight in its raised position, and means for releasing said weight from its raised position to permit the latter to drop and carry the cross-head therewith, whereby said fish trap is operated.

5. Means of the class described, comprising a vertically disposed frame, a weight slidably mounted in said frame, a cross-head also slidably mounted in said frame above said weight, means for connecting said weight with said cross-head, a winch journaled on said vertically disposed frame, a connection between said winch and said weight for raising the latter to connect same with said cross-head, an arm secured to said weight and extending beyond the edge of said frame, a rack bar pivoted at one extremity on said frame and normally held in the path of said arm, whereby when said weight is raised said arm engages with said rack bar for supporting said weight in the raised position, a bell-crank lever fulcrumed on said vertically disposed frame and having one arm thereof connected with said rack bar, and means connected with the other arm of said bell-crank lever for actuating said bell-crank lever to cause the rack bar to be disengaged from said arm and permit the said weight to drop.

In testimony whereof I affix my signature in the presence of two witnesses.

JAMES R. WHELEN.

Witnesses:
JNO. G. POWELL,
M. W. SPAULDING.

Copies of this patent may be obtained for five cents each, by addressing the "Commissioner of Patents, Washington, D. C."